US012632191B2

(12) United States Patent
Dutta et al.

(10) Patent No.: US 12,632,191 B2
(45) Date of Patent: May 19, 2026

(54) DYNAMICALLY DETERMINING A RATIO OF MEMORY BLOCKS TO INCLUDE IN A GARBAGE COLLECTION PROCESS

(71) Applicant: Sandisk Technologies, Inc., Milpitas, CA (US)

(72) Inventors: Bishwajit Dutta, Bengaluru (IN); Sharath Shivakumar, Bengaluru (IN); Chandramani Sharma, Bengaluru (IN); Amit Sharma, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 99 days.

(21) Appl. No.: 18/456,856

(22) Filed: Aug. 28, 2023

(65) Prior Publication Data

US 2025/0077102 A1     Mar. 6, 2025

(51) Int. Cl.
G06F 3/06 (2006.01)
G06F 12/02 (2006.01)

(52) U.S. Cl.
CPC .......... G06F 3/0644 (2013.01); G06F 3/0604 (2013.01); G06F 3/0608 (2013.01);
(Continued)

(58) Field of Classification Search
CPC .... G06F 3/0644; G06F 3/0604; G06F 3/0608; G06F 3/0652; G06F 3/0655; G06F 3/0679; G06F 3/0685; G06F 12/0253
See application file for complete search history.

(56) References Cited

U.S. PATENT DOCUMENTS

2010/0174847 A1* 7/2010 Paley .................. G06F 12/0246
                                                       711/E12.008
2012/0246391 A1* 9/2012 Meir .................... G11C 16/349
                                                       711/170
(Continued)

FOREIGN PATENT DOCUMENTS

CN       112506445 B  *  5/2022  ............. G06F 3/064
KR     20200068944 A  *  6/2020  ........... G06F 3/0658

OTHER PUBLICATIONS

Luo, L., Li, S., Lv, Y., & Shi, L. (2023). Performance and reliability optimization for high-density flash-based hybrid SSDs. Journal of Systems Architecture, 136, 102830 -. https://doi.org/10.1016/j.sysarc.2023.102830 (Year: 2023).*

*Primary Examiner* — Reginald G Bragdon
*Assistant Examiner* — Zakaria Mohammed Belkhayat
(74) *Attorney, Agent, or Firm* — DENTONS Durham Jones Pinegar

(57)                    ABSTRACT

A data storage device includes a first partition having memory blocks of a first type and a second partition having memory blocks of a second type. The second partition also includes hybrid memory blocks. A storage balancing system monitors a state of each partition and determines whether to initiate a garbage collection process. The storage balancing system also determines whether hybrid memory blocks, if included in the garbage collection process, are replaceable by allocating memory blocks of the second type as new hybrid memory blocks. If the storage balancing system determines the hybrid memory blocks are not replaceable, the storage balancing system dynamically determines a ratio of memory blocks of the first type and hybrid memory blocks to include in the garbage collection process.

20 Claims, 5 Drawing Sheets

(52) U.S. Cl.
    CPC .......... *G06F 3/0652* (2013.01); *G06F 3/0679*
                (2013.01); *G06F 3/0685* (2013.01); *G06F*
                *12/0253* (2013.01); *G06F 3/0655* (2013.01)

(56)                    References Cited

U.S. PATENT DOCUMENTS

2013/0138870  A1*   5/2013   Yoon ................... G06F 11/1072
                                                    711/E12.008
2020/0042223  A1*   2/2020   Li ........................... G11C 29/52
2021/0073119  A1*   3/2021   Amaki ................. G06F 3/0613
2023/0152995  A1*   5/2023   Doni ..................... G06F 3/0659
                                                       711/154
2024/0069806  A1*   2/2024   Bolisetty ................ G06F 3/064
2024/0160376  A1*   5/2024   Ghaly .................. G06F 3/0608

* cited by examiner

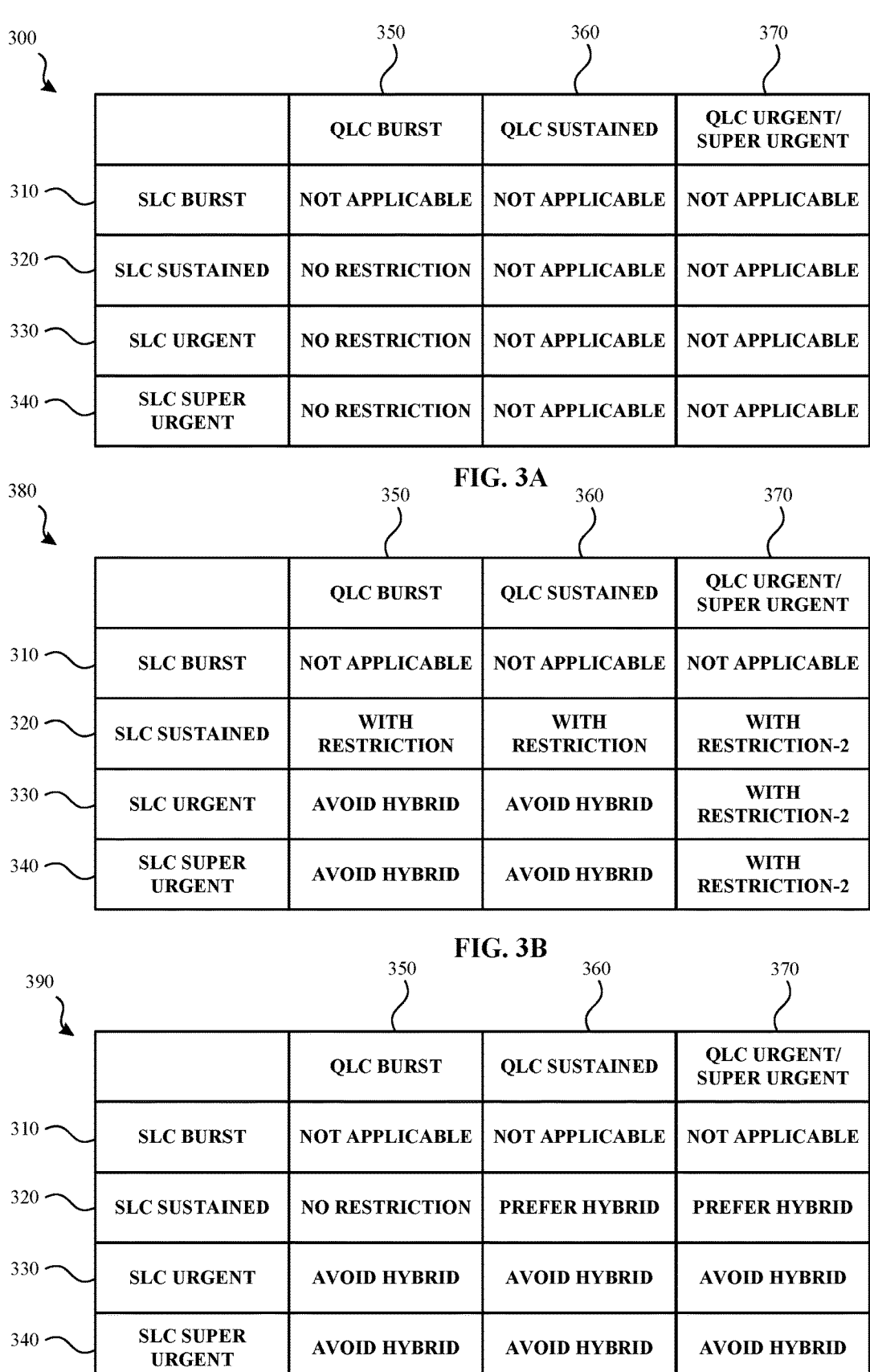

300

| | QLC BURST | QLC SUSTAINED | QLC URGENT/ SUPER URGENT |
|---|---|---|---|
| SLC BURST | NOT APPLICABLE | NOT APPLICABLE | NOT APPLICABLE |
| SLC SUSTAINED | NO RESTRICTION | NOT APPLICABLE | NOT APPLICABLE |
| SLC URGENT | NO RESTRICTION | NOT APPLICABLE | NOT APPLICABLE |
| SLC SUPER URGENT | NO RESTRICTION | NOT APPLICABLE | NOT APPLICABLE |

| | QLC BURST | QLC SUSTAINED | QLC URGENT/ SUPER URGENT |
|---|---|---|---|
| SLC BURST | NOT APPLICABLE | NOT APPLICABLE | NOT APPLICABLE |
| SLC SUSTAINED | WITH RESTRICTION | WITH RESTRICTION | WITH RESTRICTION-2 |
| SLC URGENT | AVOID HYBRID | AVOID HYBRID | WITH RESTRICTION-2 |
| SLC SUPER URGENT | AVOID HYBRID | AVOID HYBRID | WITH RESTRICTION-2 |

| | QLC BURST | QLC SUSTAINED | QLC URGENT/ SUPER URGENT |
|---|---|---|---|
| SLC BURST | NOT APPLICABLE | NOT APPLICABLE | NOT APPLICABLE |
| SLC SUSTAINED | NO RESTRICTION | PREFER HYBRID | PREFER HYBRID |
| SLC URGENT | AVOID HYBRID | AVOID HYBRID | AVOID HYBRID |
| SLC SUPER URGENT | AVOID HYBRID | AVOID HYBRID | AVOID HYBRID |

MONITOR STORAGE STATE OF
DATA STORAGE DEVICE          410

INITIATE GARBAGE
COLLECTION?          420

NO

YES

HYBRID MEMORY
BLOCKS
REPLACEABLE?          430

NO                    YES

DYNAMICALLY DETERMINE RATIO
OF SLC MEMORY BLOCK(S) AND
HYBRID MEMORY BLOCK(S)          450

INITIATE GARBAGE COLLECTION
PROCESS WITHOUT
RESTRICTION(S)          440

INITIATE GARBAGE COLLECTION
USING DETERMINED RATIO          460

DYNAMICALLY DETERMINING A RATIO OF MEMORY BLOCKS TO INCLUDE IN A GARBAGE COLLECTION PROCESS

BACKGROUND

A data storage device, such as a NAND data storage device, typically includes two partitions—a cache partition and a primary storage partition. Each partition may include different types of memory blocks. For example, the cache partition may include a number of single-level cell (SLC) memory blocks and the primary storage partition may include a number of quad-level cell (QLC) memory blocks.

QLC memory blocks have a higher density and a lower cost when compared to SLC memory blocks. However, it is faster to write data to SLC memory blocks when compared to QLC memory blocks. To boost performance of the data storage device, a number of QLC memory blocks may be identified as hybrid memory blocks. Hybrid memory blocks are QLC memory blocks that may be programmed in either a QLC mode or a SLC mode. When hybrid memory blocks are used in SLC mode, a size of the cache partition may temporarily increase.

During a garbage collection process, data may be transferred from the cache partition to the primary storage partition. If a hybrid memory block is included in the garbage collection process, data from the hybrid memory block is written to the primary storage partition and the hybrid memory block is released back to a pool of QLC memory blocks.

However, if more hybrid memory blocks than SLC memory blocks are selected for the garbage collection process, space in the primary storage partition may increase while space in the cache partition may decrease. Additionally, there is no way to ensure that any SLC memory blocks will be included in the garbage collection process. Thus, the garbage collection process may cause the cache partition to get smaller without freeing up any space in the cache partition. This could lead to reduced performance of the data storage device or even timeout conditions.

Accordingly, it would be beneficial to determine whether SLC memory blocks and/or hybrid memory blocks should be included in a garbage collection process.

SUMMARY

The present application describes a storage balancing system that may be included with a data storage device. In an example, the data storage device includes a first partition and a second partition. The first partition may be a cache partition that includes memory blocks of a first type (e.g., single-level cell (SLC) memory blocks) and the second partition may be a primary storage partition that includes a memory blocks of a second type (e.g., quad-level cell (QLC) memory blocks) and a number of hybrid memory blocks. In an example, the hybrid memory blocks may operate in either a first memory block mode or a second memory block mode.

The storage balancing system determines a state of the data storage device. Based on the determined state, the storage balancing system selects whether memory blocks of the first type and/or hybrid memory blocks should be included in a garbage collection process. For example, the storage balancing system may determine whether any hybrid memory blocks, if included in the garbage collection process, may be replaced by a memory block of the second type. If the storage balancing system determines that the hybrid memory blocks are not replaceable (e.g., based on the monitored state of the data storage device), the storage balancing system may dynamically determine a ratio of memory blocks of the first type and hybrid memory blocks to include in the garbage collection process.

Accordingly, examples, of the present disclosure describe a method that includes monitoring a storage state of a data storage device. In an example, the data storage device includes a first partition having a plurality of a first type of memory blocks and a second partition having a plurality of a second type of memory blocks and a plurality of hybrid memory blocks. A garbage collection process is initiated based, at least in part, on the monitored storage state of the data storage device. A determination is made regarding whether an amount of free space in the second partition is below a capacity threshold. Based, at least in part, on determining the amount of free space in the second partition is below the capacity threshold, a hybrid memory block is included in the garbage collection process. In an example, the hybrid memory block that is included in the garbage collection process was acting as the first type of memory block. Additionally, a second type of memory block of the plurality of the second type of memory blocks is selected to replace the hybrid memory block. The selected second type of memory block is then identified as a new hybrid memory block.

In another example, the present disclosure describes a system that includes a processor and a memory communicatively coupled to the processor. The memory stores instructions that, when executed by the processor, perform operations. In an example, the operations include monitoring a storage state of a data storage device associated with the system. The data storage device may include a first partition having a plurality of a first type of memory blocks and a second partition having a plurality of a second type of memory blocks and a plurality of hybrid memory blocks. The instructions may cause the processor to initiate a garbage collection process based, at least in part, on the monitored storage state of the data storage device. The instructions may also cause the processor to select a ratio of the first type of memory blocks to hybrid memory blocks to include in the garbage collection process based, at least in part, on the storage state of the data storage device.

In yet another example, the present disclosure describes a system that includes means for monitoring a storage state of a data storage means associated with the system. In an example, the data storage means includes a first partition having a plurality of a first type of memory blocks and a second partition having a plurality of a second type of memory blocks and a plurality of hybrid memory blocks. The system may also include means for initiating a garbage collection process based, at least in part, on the monitored storage state of the data storage means. The system may also include means for selecting a ratio of the first type of blocks to hybrid memory blocks to include in the garbage collection process based, at least in part, on the storage state of the data storage means.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 3A illustrates a table that specifies a ratio of SLC memory blocks to hybrid memory blocks that may be included in a garbage collection process when hybrid memory blocks are replaceable according to an example.

FIG. 3B illustrates a table that specifies a ratio of SLC memory blocks to hybrid memory blocks that may be included in a garbage collection process when hybrid memory blocks are not replaceable according to an example.

FIG. 3C illustrates another table that specifies a ratio of SLC memory blocks to hybrid memory blocks that may be included in a garbage collection process when hybrid memory blocks are not replaceable according to another example.

DETAILED DESCRIPTION

Figure 1:
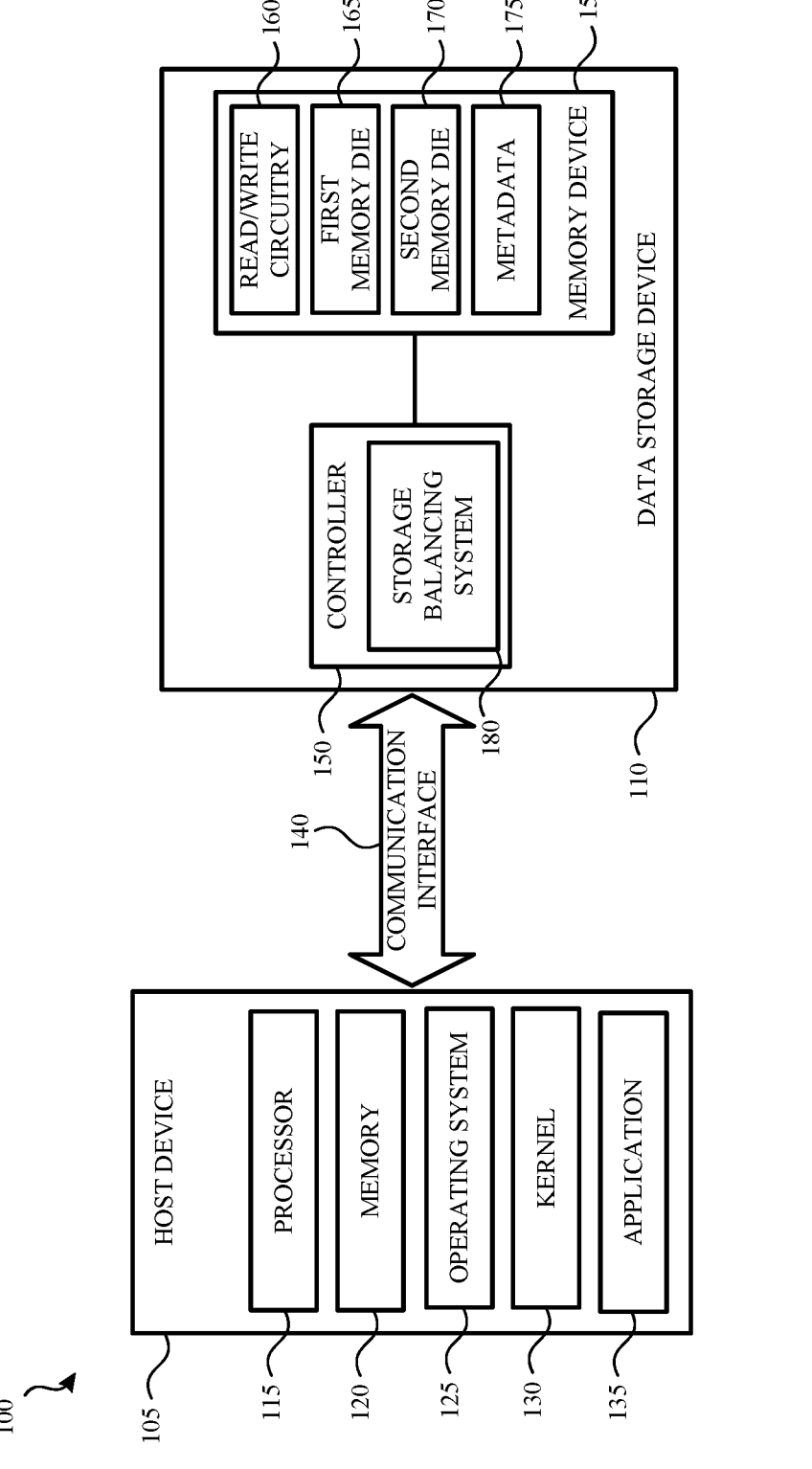
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Examples described herein are directed to a storage balancing system for a data storage device. In an example, the data storage device is a NAND data storage device that implements a hybrid architecture. For example, the data storage device may include two partitions-a cache partition and a primary storage partition. The cache partition may be comprised of a number of single-level cell (SLC) memory blocks and the primary storage partition may be comprised of a number of quad-level cell (QLC) memory blocks. In addition, the primary storage partition may include a number of hybrid memory blocks. In an example, the hybrid memory blocks may be programmable in an SLC mode or a QLC mode. When the hybrid memory blocks are programmed in the SLC mode, a size of the cache partition increases and the performance capabilities of the data storage device also increases (e.g., because it is faster to write to the SLC memory blocks when compared to QLC memory blocks).

During a garbage collection process, data is transferred from the cache partition to the primary storage partition. One or more hybrid memory blocks may be included in the garbage collection process. Once the data in the hybrid memory block has been transferred, the hybrid memory block is released to a QLC memory block pool associated with the primary storage partition.

However, if more hybrid memory blocks than SLC memory blocks are selected for the garbage collection process, space in the primary storage partition may increase while space in the cache partition may decrease. Additionally, there is no way to ensure that any SLC memory blocks will be selected as part of the garbage collection process. Thus, the garbage collection process may cause the cache partition to get smaller without freeing up any space in the cache partition. This could lead to reduced performance of the data storage device or even timeout conditions.

To address the above, the storage balancing system determines a state of the primary storage partition and/or the cache partition and performs a garbage collection process based, at least in part, on the determined state(s). For example, if the storage balancing system determines to initiate a garbage collection process (e.g., based on a state of the cache partition), the storage balancing system may also determine, based at least in part, on a state of the primary storage partition, whether a hybrid memory block in SLC mode that is released to the QLC memory block pool as part of the garbage collection process may be replaced by another QLC memory block. If so, the hybrid memory block may be included in the garbage collection process and a QLC memory block is allocated as a replacement hybrid memory block.

However, if the storage balancing system determines that the hybrid memory block is not replaceable, the storage balancing system may dynamically determine a ratio of SLC memory blocks and hybrid memory blocks to include in the garbage collection process. The ratio is based, at least in part, on a state of the cache partition and/or on a state of the primary storage partition. The ratio of SLC memory blocks and hybrid memory blocks may also be based, at least in part, on one or more processes associated with the garbage collection process.

For example, if the garbage collection process includes a folding process (e.g., data from four SLC/hybrid memory blocks is copied to a QLC memory block), a first set of states and/or ratios may be used. However, if the garbage collection process includes a compaction process, a second set of states and/or ratios may be used.

In accordance with the above, many technical benefits may be realized including, but not limited to maximizing the use of hybrid memory blocks while accounting for various states of the data storage device including program/erase (P/E) cycles associated with each memory block; improving the overall performance of the data storage device by temporarily increasing a size of a cache of the data storage device; and reducing the possibility of timeout conditions by dynamically determining which memory blocks should be included in a garbage collection process.

These benefits, along with other examples, will be shown and described in greater detail with respect to FIG. 1-FIG. 6.

FIG. 1 is a block diagram of a system 100 that includes a host device 105 and a data storage device 110 according to an example. In an example, the host device 105 includes a processor 115 and a memory 120 (e.g., main memory). The memory 120 may include or otherwise be associated with an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 may include a System on a Chip (SoC).

In an example, the memory 120 can be used by the host device 105 to store data used, or otherwise executed by, the processor 115. Data stored in the memory 120 may include instructions provided by the data storage device 110 via a communication interface 140. The data stored in the memory 120 may also include data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 may create a virtual address space for the application 135 and/or other processes executed by the processor 115. The virtual address space may map to locations in the memory 120. The operating system 125 may also include or otherwise be associated with a kernel 130. The kernel 130 may include instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 may include a controller 150 and a memory device 155. The controller 150 may be communicatively coupled to the memory device 155. In an example, the memory device 155 includes one or more memory dies (e.g., first memory die 165 and second memory die 170). Although two memory dies are shown, the memory device 155 may include any number of memory dies (e.g., one memory die, two memory dies, eight memory dies, or another number of memory dies). Additionally, although memory dies are specifically mentioned, the memory device 155 may include any non-volatile memory device, storage device, storage elements or storage medium including NAND flash memory cells and/or NOR flash memory cells.

The memory cells can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

In an example, one or more of the first memory die 165 and the second memory die 170 include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

In an example, the data storage device 110 and/or the memory device 155 may include or otherwise be associated with a first partition and a second partition. Each partition may include different types of memory blocks. For example, the first partition may be identified as a cache partition and include a number of SLC memory blocks. The second partition may be identified as a primary storage partition and include a number of QLC memory blocks. Although QLC memory blocks are specifically mentioned, the primary storage partition may include MLC memory blocks, TLC memory blocks, and/or PLC memory blocks. Additionally, the data storage device 110 may implement a hybrid architecture. As such, a subset of the QLC memory blocks may be identified as hybrid memory blocks. Accordingly, each hybrid memory block may be programmable in a first mode (e.g., a QLC mode) or a second mode (e.g., a SLC mode).

In some examples, the data storage device 110 may be attached to, or embedded within, the host device 105. In another example, the data storage device 110 may be implemented as an external device or a portable device that can be communicatively or selectively coupled to the host device 105. In yet another example, the data storage device 110 may be a component (e.g., a solid-state drive (SSD)) of a network accessible data storage system, a network-attached storage system, a cloud data storage system, and the like.

The memory device 155 may also include support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

The memory device 155 may also store metadata 175. The metadata 175 may include information about the memory device 155 and/or information about each of the first memory die 165 and the second memory die 170. For example, the metadata 175 indicate a number of P/E cycles of each memory block (e.g., QLC memory block) of each memory die, whether a particular memory block can be allocated as a hybrid memory block, a current state of each partition associated with the memory device 155, a failed bit count (FBC) associated with the memory device 155, a syndrome weight, a bit error rate (BER) and so on.

As previously described, the data storage device 110 may also include a controller 150. The controller 150 may be communicatively coupled to the memory device 155 via a bus, an interface or other communication circuitry. In an example, the communication circuitry may include one or more channels to enable the controller 150 to communicate with the first memory die 165 and/or the second memory die 170 of the memory device 155. In another example, the communication circuitry may include multiple distinct channels which enables the controller 150 to communicate with the first memory die 165 independently and/or in parallel with the second memory die 170 of the memory device 155.

The controller 150 may receive data and/or instructions from the host device 105. The controller 150 may also send data to the host device 105. For example, the controller 150 may send data to and/or receive data from the host device 105 via the communication interface 140. The controller 150 may also send data and/or commands to and/or receive data from the memory device 155.

The controller 150 may send data and a corresponding write command to the memory device 155 to cause the memory device 155 to store data at a specified address of the memory device 155. In an example, the write command specifies a physical address of a portion of the memory device 155. The controller 150 may also send data and/or commands associated with one or more background scanning operations, garbage collection operations, and/or wear leveling operations.

The controller 150 may also send one or more read commands to the memory device 155. In an example, the read command specifies the physical address of a portion of the memory device 155 at which the data is stored. The controller 150 may also track the number of program/erase cycles or other programming operations that have been performed on or by the memory device and/or the memory dies of the memory device 155.

The controller 150 may also include or otherwise be associated with a storage balancing system 180. The storage balancing system 180 may be a packaged functional hardware unit designed for use with other components/systems, a portion of a program code (e.g., software or firmware) executable by a processor or processing circuitry, or a self-contained hardware and/or software component that interfaces with other components and/or systems.

The storage balancing system 180 may monitor or check the state of each partition associated with the data storage device 155. Based on the determined/monitored state, the storage balancing system 180 may determine whether to initiate a garbage collection process and/or a relocation process. The storage balancing system 180 may also determine whether a hybrid memory block that is included in the garbage collection process, and subsequently released to a memory block pool associated with the primary storage partition, may be replaced by a newly allocated hybrid memory block.

For example, if the hybrid memory block that was included in the garbage collection process is a QLC memory block, the storage balancing system 180 determines, based on a state of the primary storage partition, whether another QLC memory block may be used as a replacement hybrid memory block. If the storage balancing system 180 determines that the QLC memory block may be used as a replacement hybrid memory block, the QLC memory block is identified as a new hybrid memory block. The hybrid memory block that was included in the garbage collection process may then be released to the QLC memory block pool associated with the primary storage partition.

In an example, the storage balancing system 180 selects QLC memory blocks as replacement hybrid memory blocks based, at least in part, on information associated with the QLC memory blocks. For example, the storage balancing system 180 may select a particular QLC memory block as a replacement hybrid memory block based, at least in part, on a number of P/E cycles associated with the QLC memory block. In an example, the storage balancing system selects the QLC memory block with the lowest P/E cycles as the replacement hybrid memory block. In another example, the QLC memory block that is selected as the replacement hybrid memory block may be associated with a reliability threshold (e.g., a failed bit count or BER associated with the QLC memory block may be below a threshold).

In an example, a certain percentage of QLC memory blocks (e.g., ten percent) may be allocated for use as hybrid memory blocks. However, the storage balancing system 180 may dynamically update or change the amount of QLC memory blocks that can be used or otherwise identified as hybrid memory blocks.

The storage balancing system 180 may also determine whether and when to initiate a garbage collection process on the cache partition of the data storage device 110. For example, the storage balancing system 180 may initiate a garbage collection process on the cache partition when a regular sustained threshold of SLC memory blocks in the cache partition have been filled and when a particular number of hybrid memory blocks have been filled.

For example, the cache partition of the memory device 155 may include a SLC memory block pool of twenty-five memory blocks. The primary storage partition of the memory device 155 may include a QLC memory block pool of five hundred memory blocks. In this example, ten percent (e.g., fifty) of the QLC memory blocks are identified as hybrid memory blocks. Further, in this example, the sustained threshold of the cache partition is twenty SLC memory blocks. Thus, when twenty SLC memory blocks and fifty hybrid memory blocks have been used/filled in the cache partition, the storage balancing system 180 may initiate the garbage collection process.

In this example, the garbage collection process includes a folding process. As such, four SLC memory block sources may be selected for folding into a single QLC memory block in the primary storage partition. Further, of the four SLC memory block sources, three of the memory blocks may be hybrid memory blocks and one memory block may be a SLC memory block.

In current implementations (e.g., implementations in which a data storage device does not include a storage balancing system 180), although four memory blocks are folded into the primary storage partition and released, only the SLC memory block may be used for subsequent write operations. Further, additional garbage collection operations may cease because a sufficient amount of room in the cache partition may not have been freed. Thus, when additional write commands are received, there may not be sufficient room in the cache partition. As such, an additional garbage collection process may need to commence which may cause significant delays.

To address the above, the storage balancing system 180 determines whether the three hybrid memory blocks that were included in the garbage collection process can be replaced. If so, the storage balancing system 180 selects three QLC memory blocks as replacement hybrid memory blocks. In an example, the QLC memory blocks that are selected have under a threshold amount of P/E cycles (or the lowest number of P/E cycles). As such, the size of the cache partition may be maximized while also improving the write performance of the memory device 155.

Additionally, the storage balancing system 180 may also dynamically determine a ratio of SLC memory blocks to hybrid memory blocks that are included in the garbage collection process. In an example, the ratio of SLC memory blocks to hybrid memory blocks may be dynamically determined when the storage balancing system 180 determines that hybrid memory blocks that are included in the garbage collection process cannot be replaced (at least until QLC memory blocks in the primary storage partition are freed). In an example, the ratio is based, at least in part, on a state of the memory device 155. For example, the storage balancing system 180 determines a state of the cache partition and a state of the primary storage partition.

As will be explained in greater detail herein, each state is a combination of the available free space in each partition. For example, the available free space/memory blocks decreases as each partition moves from burst to sustained, from sustained to urgent and from urgent to super urgent. In an example, each state may be associated with a particular free space/memory block threshold. In addition, the ratio of SLC memory blocks to hybrid memory blocks may be based on whether the garbage collection process includes folding or compaction.

Figures 2A, 2B:
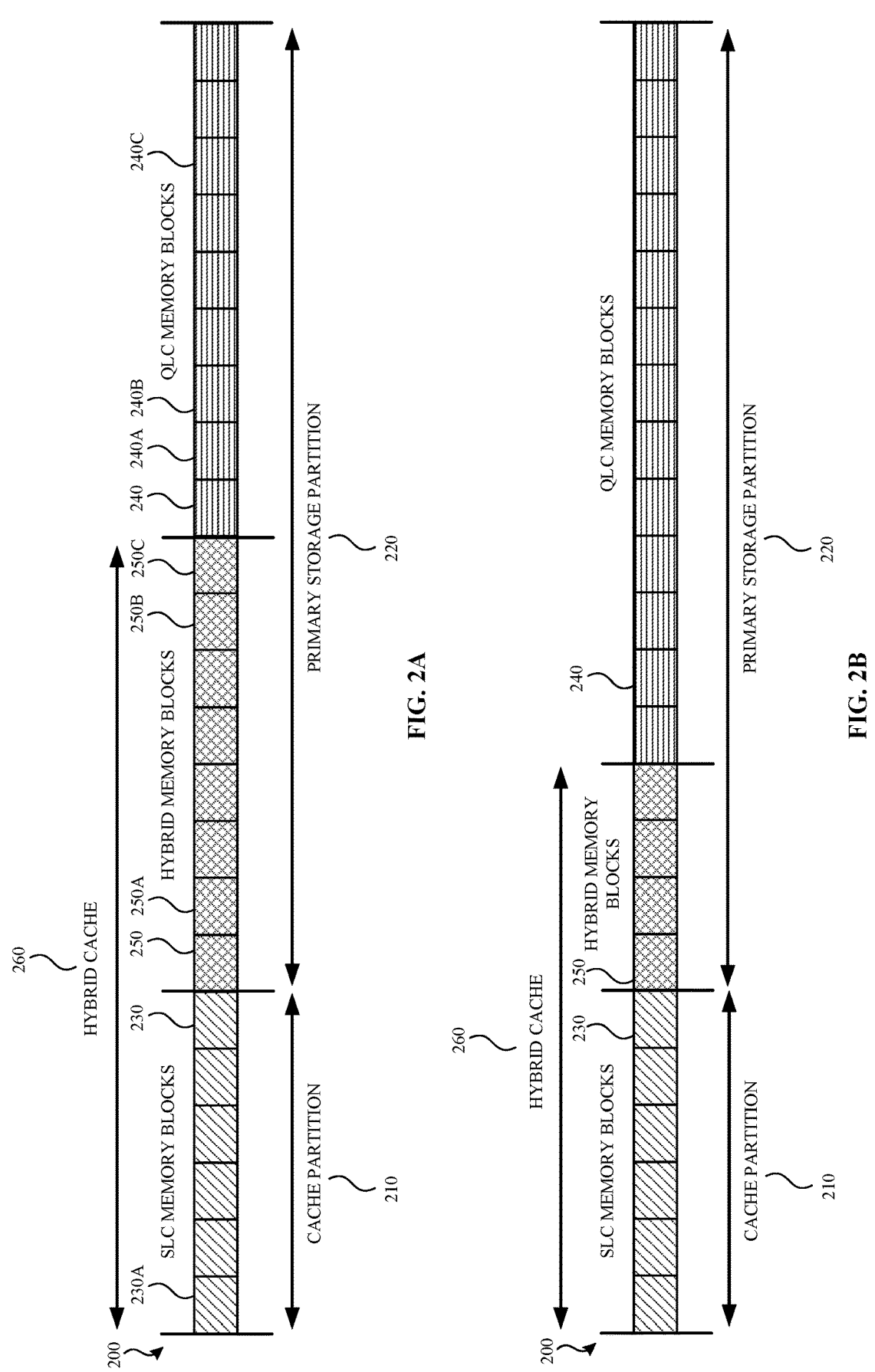
FIG. 2A illustrates a memory device having a first partition and a second partition according to an example.
FIG. 2B illustrates the data storage device of FIG. 2A in which the primary storage partition has reached a capacity threshold according to an example.

FIG. 2A illustrates a memory device 200 having a first partition and a second partition according to an example. In an example, the memory device 200 may be similar to the memory device 155 shown and described with respect to FIG. 1.

As previously indicated, the memory device 200 has two partitions. In an example, the first partition may be a cache partition 210 and the second partition may be a primary storage partition 220. The cache partition 210 may be comprised of, or otherwise include, a first type of memory block. For example, the cache partition 210 may include a number of SLC memory blocks 230. Likewise, the primary storage partition 220 may include a second type of memory block. For example, the primary storage partition 220 may include a number of QLC memory blocks 240.

In an example, the memory device 200 may also implement a hybrid architecture. As such, the memory storage device 200 may also include a number of hybrid memory blocks 250. The hybrid memory blocks 250 may be QLC memory blocks that are part of the primary storage partition 220. However, the hybrid memory blocks 250 may be programmable in different modes. For example, the hybrid memory blocks 250 may be programmable in a SLC mode or a QLC mode. When the hybrid memory blocks 250 are programmed in the QLC mode, they are included in the primary storage partition 220. However, when the hybrid memory blocks 250 are programmed in the SLC mode, they may be included, along with the SLC memory blocks 230, as part of a hybrid cache 260.

In an example, the memory device may be associated with a storage balancing system. In an example, the storage balancing system may be similar to the storage balancing system 180 shown and described with respect to FIG. 1. The storage balancing system periodically or continuously monitors the state of the cache partition 210 (or the hybrid cache 260) and the primary storage partition 220.

Based on the monitored state of the cache partition 210 (or the hybrid cache 260), the storage balancing system (or a controller associated with the memory device 200) may determine whether and when to initiate a garbage collection process (or a data relocation process). The garbage collection process may be used to move or relocate data from the hybrid cache 260 and/or the SLC partition 210 to one or more QLC memory blocks 240 in the primary storage partition 220.

For example, the storage balancing system may initiate a garbage collection process on the cache partition 210 (or the hybrid cache 260) when a minimum number of SLC memory blocks 230 have been filled and when a particular number of hybrid memory blocks 250 have been filled. For example, the cache partition 210 of the memory device 200 may include twenty-five SLC memory blocks 230. The primary storage partition 220 of the memory device 200 may include a five hundred QLC memory blocks 240. However, fifty of the QLC memory blocks may be identified as hybrid memory blocks 250.

In this example, the storage balancing system may initiate the garbage collection processes when twenty out of the twenty-five SLC memory blocks 230 have been filled and when all fifty of the hybrid memory blocks 250 have been filled. Although specific examples are given, the garbage collection process may be initiated when any number of SLC memory blocks 230 and/or hybrid memory blocks 250 have been filled.

In this example, four SLC memory block sources are included in the garbage collection process. For example, a first SLC memory block 230A may be selected, along with a first hybrid memory block 250A, a second hybrid memory block 250B and a third hybrid memory block 250C. The data from each of these memory blocks may be folded into or otherwise transferred to a particular QLC memory block 240.

The storage balancing system determines, based on a state of the primary storage partition 220, whether the first hybrid memory block 250A, the second hybrid memory block 250B and the third hybrid memory block 250C may be replaced (e.g., whether one or more QLC memory blocks 240 may be allocated as hybrid memory blocks 250). In an example, QLC memory blocks 240 may be used to replace hybrid memory blocks 250 that were included in a garbage collection process if the primary storage partition 220 is under a capacity threshold.

For example, the storage balancing system may determine that the primary storage partition 220 is under ninety percent capacity. As such, when hybrid memory blocks 250 are included in the garbage collection process, the first hybrid memory block 250A, the second hybrid memory block 250B and the third hybrid memory block 250C may be replaced by newly allocated QLC memory blocks 240. Although ninety percent capacity is specifically mentioned, other thresholds may be used.

The storage balancing system may then select which QLC memory blocks 240 can/should be allocated as replacement hybrid memory blocks. In an example, the storage balancing system may select a first QLC memory block 240A, a second QLC memory block 240B and a third QLC memory block 240C as replacement hybrid memory blocks. The selection of QLC memory blocks may be based on a determination as to whether the QLC memory blocks have a number of P/E cycles that are below a threshold number of P/E cycles. In another example, QLC memory blocks that have the fewest number of P/E cycles are selected. Although P/E cycles are specifically mentioned, other factors may be considered.

Over time, a scenario may arise in which hybrid memory blocks 250 that are included in the garbage collection process are not replaceable. For example, the capacity of the primary storage partition 220 may reach the capacity threshold and/or data stored by one or more QLC memory blocks 240 may need to be relocated.

FIG. 2B illustrates the data storage device 200 of FIG. 2A in which the primary storage partition 220 has reached a capacity threshold according to an example. Because the primary storage partition 220 has reached the capacity threshold, hybrid memory blocks 250 may not be replaceable if included in a garbage collection process. Although a capacity threshold is specifically mentioned, there may be other reasons as to why hybrid memory blocks 250 are not replaceable by one or more QLC memory blocks 240.

As with previous examples, the storage balancing system monitors the state of the memory device 200 and determines whether and/or when to initiate a garbage collection process on the hybrid cache 260 and/or the cache partition 210. When the garbage collection process is initiated, the storage balancing system determines whether any hybrid memory blocks 250 that may be included in the garbage collection are replaceable.

In this example, the storage balancing system determines that the hybrid memory blocks 250 are not replaceable. As such, the storage balancing system dynamically determines which memory blocks should be included in the garbage collection process. For example, the storage balancing system dynamically determines how many SLC memory blocks 230 to include in the garbage collection process and how many hybrid memory blocks 250 to include in the garbage collection process.

The ratio of SLC memory blocks 230 to hybrid memory blocks 250 may be based, at least in part, on a state of the memory device 200. For example, the storage balancing system determines a state of the cache partition 210 and a state of the primary storage partition 220.

In an example, each state is a combination of the available free space in the cache partition 210 and the primary storage partition 220. For example and referring to FIG. 3A-FIG. 3C, the available free space/memory in the cache partition 210 may be represented as SLC Burst 310, SLC Sustained 320, SLC Urgent 330, and SLC Super Urgent 340. Likewise, the state of the primary storage partition may be represented as QLC Burst 350, QLC Sustained 360 and QLC Urgent/Super Urgent 370. In an example, each state may be associated with a free space threshold. For example, if the cache partition 210 included twenty-five memory blocks, an estimate of SLC memory blocks that are filled at a SLC Sustained 320 threshold is ten, an estimate of SLC memory blocks that are filled at the SLC Urgent 330 threshold is eighteen and an estimate of SLC memory blocks that are filled at SLC Super Urgent 340 is twenty-two. Although specific numbers are given, these are for example purposes only.

FIG. 3A illustrates a table 300 that specifies a ratio of SLC memory blocks to hybrid memory blocks that may be included in a garbage collection process when hybrid memory blocks are replaceable according to an example. As shown in FIG. 3A, when hybrid memory blocks are replaceable, there are no restrictions to whether SLC memory blocks or hybrid memory blocks are included in the garbage collection process.

For example, as shown in the table 300, when the cache partition is in a sustained mode (e.g., SLC sustained 320), an urgent mode (e.g., SLC urgent 330) or a super urgent mode (e.g., SLC Super Urgent 340) and when the primary storage cache is in a burst mode (e.g., QLC Burst 350), there are no restrictions as to whether SLC memory blocks or hybrid memory blocks are included in garbage collection process. Thus, any number of SLC memory blocks or hybrid memory blocks may be selected as source blocks for a garbage collection process.

FIG. 3B illustrates a table 380 that specifies a ratio of SLC memory blocks to hybrid memory blocks that may be included in a garbage collection process when hybrid memory blocks are not replaceable according to an example. In this example, the garbage collection process includes a folding process in which data from four SLC sources (e.g., one or more hybrid memory blocks and/or one or more SLC memory blocks) is moved to a single QLC memory block.

In this example and depending on a state of each partition, M hybrid memory blocks can be selected as a folding source where M {min, max}={1, 4} and N SLC memory blocks may be selected as a folding source where N {max, min}={4, 0}. For example, when the cache partition is in a sustained mode (e.g., SLC sustained 320) and the primary storage partition is in a burst mode (e.g., QLC Burst 350) or a sustained mode (e.g., QLC Sustained 360), the folding process may occur "With Restriction". In an example, "With Restriction" means that the ratio of SLC memory blocks to hybrid memory blocks that are included in the folding process is 3:1.

However, when the cache partition is in an urgent mode (e.g., SLC Urgent 330) or a super urgent mode (e.g., SLC Super Urgent 340) and the primary storage partition is in a burst mode or a sustained mode, the folding process is to "Avoid Hybrid". In an example, "Avoid Hybrid" indicates that SLC memory blocks should be selected over any hybrid memory blocks—even if four SLC memory blocks are selected for the folding process.

In yet another example, when the cache partition is in a sustained mode (e.g., SLC Sustained 330), an urgent mode (e.g., SLC urgent 330) or a super urgent mode (e.g., SLC Super Urgent 340) and the primary storage partition is in an urgent or a super urgent mode (e.g., QLC Urgent/Super Urgent 370), the folding process may occur "With Restriction-2". In an example, "With Restriction-2" means that the ratio of SLC memory blocks to hybrid memory blocks in the folding process is 2:2.

In an example, the table 380 may be used until hybrid relocation is enabled. For example, the folding ratio shown in table 380 may occur until a sufficient number of QLC memory blocks have been freed (presuming some QLC memory blocks are below the P/E cycle threshold) and may once again be used as replacement hybrid memory blocks.

FIG. 3C illustrates another table 390 that specifies a ratio of SLC memory blocks to hybrid memory blocks that may be included in a garbage collection process when hybrid memory blocks are not replaceable according to another example. In this example, the garbage collection process includes a compaction process. In an example, only one block is selected for compaction at a time. Thus, the SLC memory block to hybrid memory block ratio for compaction can be 1:0 or 0:1. For example, the hybrid memory blocks that do not qualify as a folding source may be freed by a SLC memory block compaction path.

As shown in FIG. 3C, when the cache partition is in a sustained mode (e.g., SLC sustained 320) and the primary storage partition is in a burst mode (e.g., QLC Burst 350), there are "No Restrictions" to the compaction process. However, when the cache partition is in a sustained mode and the primary storage partition is in a sustained mode (e.g., QLC Sustained 350) or an urgent/super urgent mode (e.g., QLC Urgent/Super Urgent 370), the compaction process may be instructed to "Prefer Hybrid". In an example, "Prefer Hybrid" means that hybrid memory blocks should be selected over SLC memory blocks during compaction.

However, when the cache partition is in an urgent mode (e.g., SLC Urgent 330) or a super urgent mode (e.g., SLC Super Urgent 340) and the primary storage partition is in a burst mode, a sustained mode, or an urgent/super urgent mode, the compaction process is to "Avoid Hybrid".

Figure 4:
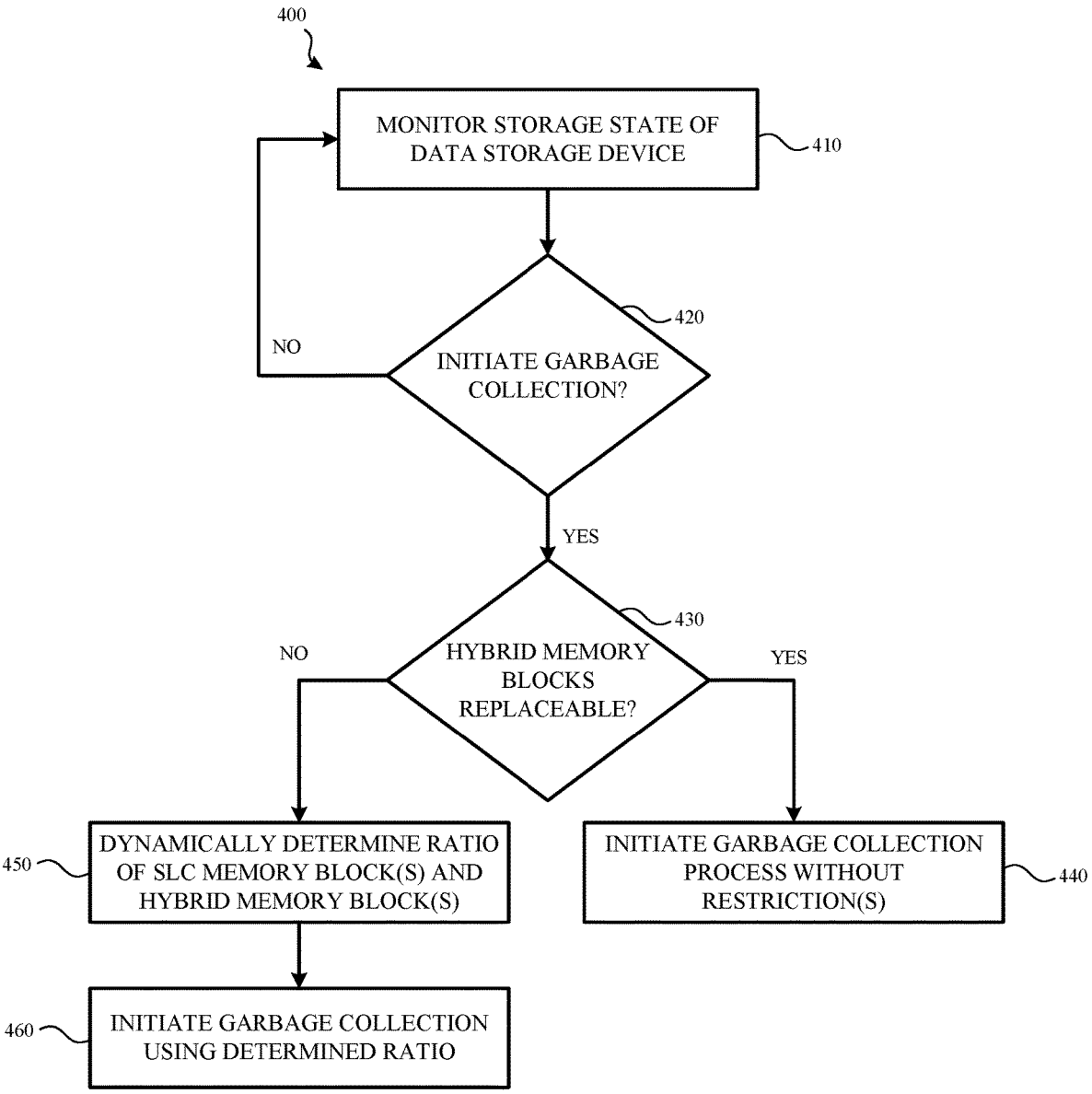
FIG. 4 illustrates a method for dynamically determining a ratio of different types of memory blocks of a data storage device to include in a garbage collection process according to an example.

FIG. 4 illustrates a method 400 for dynamically determining a ratio of different types of memory blocks of a data storage device to include in a garbage collection process according to an example. In an example, the method 400 may be performed by a storage balancing system (e.g., the storage balancing system 180) shown and described with respect to FIG. 1.

The method 400 may begin when the storage balancing system monitors (410) a state of the data storage device. In an example, the data storage device may include a first partition and a second partition. Additionally, each partition may include different types of memory blocks. For example, the first partition may be a SLC partition and include a number of SLC memory blocks. In another example, the second partition may be a QLC partition and include a number of QLC memory blocks. Additionally, the QLC partition may also include one or more hybrid memory blocks. In an example, the hybrid memory blocks may be programmed (e.g., written to) in two different modes (e.g., a SLC mode or a QLC mode).

As previously indicated, the storage balancing system may monitor the state of the data storage device and/or monitor the state of each of the different partitions of the data storage device. Based on the state of the first partition and/or the second partition, the storage balancing system may determine (420) whether to initiate a garbage collection process. In an example, the determination may be based on an amount of storage remaining in the first partition and/or an amount of hybrid memory blocks to which data has been written.

If the storage balancing system determines (420) that a garbage collection process should not be initiated, the storage balancing system continues monitoring (410) the state of the data storage device. However, if the storage balancing system determines (420) that the garbage collection process should be initiated, the storage balancing system determines (430) whether any hybrid memory blocks included in the garbage collection process are replaceable. For example, the storage balancing system determines whether any memory blocks in the second partition may be allocated as replacement hybrid memory blocks.

For example, the storage balancing system may check the state of the second partition to determine whether the second partition has a sufficient number of memory blocks available to select replacement hybrid memory blocks. For example, the storage balancing system may determine whether the second partition is under a storage capacity threshold (e.g., whether the second partition is under ninety percent full). If it is determined that the second partition is under the storage capacity threshold, the storage balancing system may initiate (440) the garbage collection process. In an example, the garbage collection process may be initiated without restrictions (such as indicated in FIG. 3A).

However, if the storage balancing system determines (430) that the hybrid memory blocks are not replaceable (e.g., the second partition is over the storage capacity threshold), the storage balancing system dynamically determines (450) a ratio of SLC memory blocks and hybrid memory blocks to be included in the garbage collection process. In an example, the ratio of SLC memory blocks and hybrid memory blocks to be included in the garbage collection process is based, at least in part, on a state of the first partition and/or on a state of the second partition. The ratio of SLC memory blocks to hybrid memory blocks may also be based on whether the garbage collection process includes a folding process or a compaction process.

For example, if the garbage collection process includes a folding process, the ratio of SLC memory blocks to hybrid memory blocks may be based on the table 380 shown and described with respect to FIG. 3B. However, if the garbage collection process includes a compaction process, the ratio of SLC memory blocks to hybrid memory blocks may be based on the table 390 shown and described with respect to FIG. 3C.

Once the ratio of SLC memory blocks to hybrid memory blocks is determined, the storage balancing system may initiate (460) the garbage collection process based on the determined ratio.

Figures 5, 6:
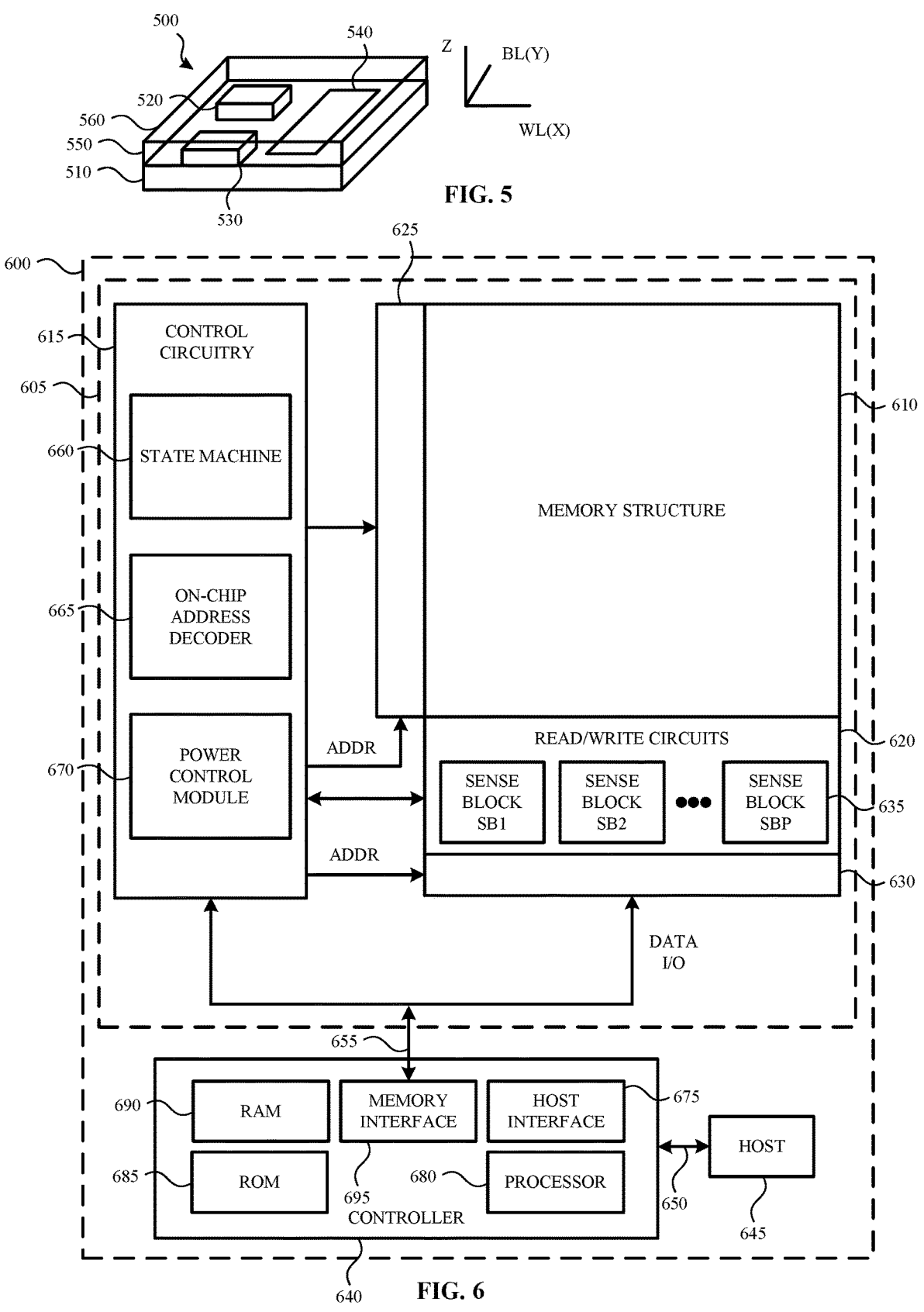
FIG. 5 is a perspective view of a storage device that includes three-dimensional (3D) stacked non-volatile memory according to an example.
FIG. 6 is a block diagram of a storage device according to an example.

FIG. 5-FIG. 6 describe example storage devices that may be used with or otherwise implement the various features described herein. For example, the storage devices shown and described with respect to FIG. 5-FIG. 6 may include various systems and components that are similar to the systems and components shown and described with respect to FIG. 1. For example, the controller 640 shown and described with respect to FIG. 6 may be similar to the controller 150 of FIG. 1. Likewise, the memory dies 605 may be similar to the first memory die 165 and/or the second memory die 170 of FIG. 1.

FIG. 5 is a perspective view of a storage device 500 that includes three-dimensional (3D) stacked non-volatile memory according to an example. In this example, the storage device 500 includes a substrate 510. Blocks of memory cells are included on or above the substrate 510. The blocks may include a first block (BLK0 520) and a second block (BLK1 530). Each block may be formed of memory cells (e.g., non-volatile memory elements). The substrate 510 may also include a peripheral area 540 having support circuits that are used by the first block and the second block.

The substrate 510 may also carry circuits under the blocks, along with one or more lower metal layers which are patterned in conductive paths to carry signals from the circuits. The blocks may be formed in an intermediate region 550 of the storage device 500. The storage device may also include an upper region 560. The upper region 560 may include one or more upper metal layers that are patterned in conductive paths to carry signals from the circuits. Each block of memory cells may include a stacked area of memory cells. In an example, alternating levels of the stack represent word lines. While two blocks are depicted, additional blocks may be used and extend in the x-direction and/or the y-direction.

In an example, a length of a plane of the substrate 510 in the x-direction represents a direction in which signal paths for word lines or control gate lines extend (e.g., a word line or drain-end select gate (SGD) line direction) and the width of the plane of the substrate 510 in the y-direction represents a direction in which signal paths for bit lines extend (e.g., a bit line direction). The z-direction represents a height of the storage device 500.

FIG. 6 is a functional block diagram of a storage device 600 according to an example. In an example, the storage device 600 may be the 3D stacked non-volatile storage device 500 shown and described with respect to FIG. 5. The components depicted in FIG. 6 may be electrical circuits. In an example, the storage device 600 includes one or more memory dies 605. Each memory die 605 includes a three-dimensional memory structure 610 of memory cells (e.g., a 3D array of memory cells), control circuitry 615, and read/write circuits 620. In another example, a two-dimensional array of memory cells may be used. The memory structure 610 is addressable by word lines using a first decoder 625 (e.g., a row decoder) and by bit lines using a second decoder 630 (e.g., a column decoder). The read/write circuits 620 may also include multiple sense blocks 635 including SB1, SB2, . . . , SBp (e.g., sensing circuitry) which allow pages of the memory cells to be read or programmed in parallel. The sense blocks 635 may include bit line drivers.

In an example, a controller 640 is included in the same storage device 600 as the one or more memory dies 605. In another example, the controller 640 is formed on a die that is bonded to a memory die 605, in which case each memory die 605 may have its own controller 640. In yet another example, a controller die controls all of the memory dies 605.

Commands and data may be transferred between a host 645 and the controller 640 using a data bus 650. Commands and data may also be transferred between the controller 640 and one or more of the memory dies 605 by way of lines 655. In one example, the memory die 605 includes a set of input and/or output (I/O) pins that connect to lines 655.

The memory structure 610 may also include one or more arrays of memory cells. The memory cells may be arranged in a three-dimensional array or a two-dimensional array. The memory structure 610 may include any type of non-volatile memory that is formed on one or more physical levels of arrays of memory cells having an active area disposed above a silicon substrate. The memory structure 610 may be in a non-volatile memory device having circuitry associated with the operation of the memory cells, whether the associated circuitry is above or within the substrate.

The control circuitry 615 works in conjunction with the read/write circuits 620 to perform memory operations (e.g., erase, program, read, and others) on the memory structure 610. The control circuitry 615 may include registers, ROM fuses, and other devices for storing default values such as base voltages and other parameters.

The control circuitry 615 may also include a state machine 660, an on-chip address decoder 665 and a power control module 670. The state machine 660 may provide chip-level control of various memory operations. The state machine 660 may be programmable by software. In another example, the state machine 660 does not use software and is completely implemented in hardware (e.g., electrical circuits).

The on-chip address decoder 665 may provide an address interface between addresses used by host 645 and/or the controller 640 to a hardware address used by the first decoder 625 and the second decoder 630.

The power control module 670 may control power and voltages that are supplied to the word lines and bit lines during memory operations. The power control module 670 may include drivers for word line layers in a 3D configuration, select transistors (e.g., SGS and SGD transistors) and source lines. The power control module 670 may include one or more charge pumps for creating voltages.

The control circuitry 615, the state machine 660, the on-chip address decoder 665, the first decoder 625, the second decoder 630, the power control module 670, the sense blocks 635, the read/write circuits 620, and/or the controller 640 may be considered one or more control circuits and/or a managing circuit that perform some or all of the operations described herein.

In an example, the controller 640, is an electrical circuit that may be on-chip or off-chip. Additionally, the controller 640 may include one or more processors 680, ROM 685, RAM 690, memory interface 695, and host interface 675, all of which may be interconnected. In an example, the one or more processors 680 is one example of a control circuit. Other examples can use state machines or other custom circuits designed to perform one or more functions. Devices such as ROM 685 and RAM 690 may include code such as a set of instructions. One or more of the processors 680 may be operable to execute the set of instructions to provide some or all of the functionality described herein.

Alternatively or additionally, one or more of the processors 680 may access code from a memory device in the memory structure 610, such as a reserved area of memory cells connected to one or more word lines. The memory interface 695, in communication with ROM 685, RAM 690, and one or more of the processors 680, may be an electrical circuit that provides an electrical interface between the controller 640 and the memory die 605. For example, the memory interface 695 may change the format or timing of signals, provide a buffer, isolate from surges, latch I/O, and so forth.

The one or more processors 680 may issue commands to control circuitry 615, or any other component of memory die 605, using the memory interface 695. The host interface 675, in communication with the ROM 685, the RAM 695, and the one or more processors 680, may be an electrical circuit that provides an electrical interface between the controller 640 and the host 645. For example, the host interface 675 may change the format or timing of signals, provide a buffer, isolate from surges, latch I/O, and so on. Commands and data from the host 645 are received by the controller 640 by way of the host interface 675. Data sent to the host 645 may be transmitted using the data bus 650.

Multiple memory elements in the memory structure 610 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

One of ordinary skill in the art will recognize that the technology described herein is not limited to a single specific memory structure, but covers many relevant memory structures within the spirit and scope of the technology as described herein and as understood by one of ordinary skill in the art. One of skill in the art also will note that while the invention is described in terms of SLC and QLC memory blocks, in some embodiments, triple-level cell (TLC) memory blocks and multi-level cell (MLC) blocks may be substituted for QLC memory blocks.

In accordance with present disclosure examples herein describe a method, comprising: monitoring a storage state of a data storage device, the data storage device including a first partition having a plurality of a first type of memory blocks and a second partition including a plurality of a second type of memory blocks and a plurality of hybrid memory blocks; initiating a garbage collection process based, at least in part, on the monitored storage state of the data storage device; determining whether an amount of free space in the second partition is below a capacity threshold; and based, at least in part, on determining the amount of free space in the second partition is below the capacity threshold: including a hybrid memory block in the garbage collection process, the hybrid memory block acting as the first type of memory block; selecting a second type of memory block of the plurality of the second type of memory blocks to replace the hybrid memory block; and identifying the selected second type of memory block as a new hybrid memory block. In an example, the selected second type of memory block of the plurality of the second type of memory blocks is selected based, at least in part, on a number of program/erase (P/E) cycles associated with the selected second type of memory block. In an example, the storage state of the data storage device is based, at least in part, on one or more of a number of free memory blocks in the first partition and a number of free memory blocks in the second partition. In an example, the method also includes selecting a ratio of the first type of memory blocks to hybrid memory blocks to include in the garbage collection process based, at least in part, on determining the amount of free space in the second partition is above the capacity threshold. In an example, the ratio of the first type of memory blocks to hybrid memory blocks is based, at least in part, on a state of the first partition and a state of the second partition. In an example, the state of the first partition is selected from a group of states including a burst state, a sustained state, an urgent state and a super urgent state. In an example, the state of the second partition is selected from a group of states including a burst state, a sustained state, an urgent state and a super urgent state. In an example, the garbage collection process includes a folding process or a compaction process and the ratio of the first type of memory blocks to hybrid memory blocks is based, at least in part, on whether the garbage collection process includes the folding process or the compaction process. In an example, the first type of memory blocks are single-level cell (SLC) memory blocks and the second type of memory blocks are quad-level cell (QLC) memory blocks. In an example, the method also includes causing the new hybrid memory block to operate in a mode associated with the first type of memory blocks.

Examples of the present disclosure also describe a system, comprising: a processor; and a memory communicatively coupled to the processor and storing instructions that, when executed by the processor, perform operations, comprising: monitoring a storage state of a data storage device associated with the system, the data storage device including a first partition comprising a plurality of a first type of memory blocks and a second partition comprising a plurality of a second type of memory blocks and a plurality of hybrid memory blocks; initiating a garbage collection process based, at least in part, on the monitored storage state of the data storage device; and selecting a ratio of the first type of memory blocks to hybrid memory blocks to include in the garbage collection process based, at least in part, on the storage state of the data storage device. In an example, the instructions also include instructions for determining whether a hybrid memory block that is included in the garbage collection process is replaceable by a second type of memory block of the plurality of the second type of memory blocks. In an example, the second type of memory block of the plurality of the second type of memory blocks is selected based, at least in part, on a number of program/erase (P/E) cycles associated with the second type of memory block. In an example, the storage state of the data storage device includes an amount of available space in the first partition and an amount of available space in the second partition. In an example, the garbage collection process includes one of a compaction process and a folding process. In an example, selecting the ratio of the first type of memory blocks to the hybrid memory blocks to include in the garbage collection process is based, at least in part, on whether the garbage collection process includes the compaction process or the folding process.

In yet another example, the present disclosure describes a system, comprising: means for monitoring a storage state of a data storage means associated with the system, the data storage means including a first partition comprising a plurality of a first type of memory blocks and a second partition comprising a plurality of a second type of memory blocks and a plurality of hybrid memory blocks; means for initiating a garbage collection process based, at least in part, on the monitored storage state of the data storage means; and means for selecting a ratio of the first type of blocks to hybrid memory blocks to include in the garbage collection process based, at least in part, on the storage state of the data storage means. In an example, the system also includes means for determining whether a hybrid memory block that is included in the garbage collection process is replaceable by a second type of memory block of the plurality of the second type of memory blocks. In an example, the second type of memory block of the plurality of the second type of memory blocks is selected based, at least in part, on a number of program/erase (P/E) cycles associated with the second type of memory block. In an example, the first type of memory blocks are single-level cell (SLC) memory blocks and the second type of memory blocks are quad-level cell (QLC) memory blocks.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B. or A and C. or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
   monitoring an amount of available space in a first partition of a data storage device and in a second partition of the data storage device, the first partition having a plurality of a first type of memory blocks and the second partition having a plurality of a second type of memory blocks and having a plurality of hybrid memory blocks;
   initiating a garbage collection process based, at least in part, on the amount of available space in the first partition of the data storage device and the amount of available space in the second partition of the data storage device;
   selecting a ratio of the first type of memory blocks to hybrid memory blocks to include in the garbage collection process based, at least in part, on the amount of available space in the first partition, the amount of available space in the second partition and on a type of garbage collection process that is initiated.

2. The method of claim 1, wherein the amount of available space in the first partition and the amount of available space in the second partition are indicative of a state of the first partition and a state of the second partition.

3. The method of claim 2, wherein the state of the first partition is selected from a group of states including a burst state, a sustained state, an urgent state and a super urgent state.

4. The method of claim 2, wherein the state of the second partition is selected from a group of states including a burst state, a sustained state, an urgent state and a super urgent state.

5. The method of claim 2, wherein the garbage collection process includes one of a folding process and a compaction process.

6. The method of claim 1, wherein the first type of memory blocks are single-level cell (SLC) memory blocks and the second type of memory blocks are selected from a group of memory blocks comprising multi-level cell (MLC) memory blocks, triple-level cell (TLC) memory blocks, quad-level cell (QLC) memory blocks and penta-level cell (PLC) memory blocks.

7. The method of claim 1, wherein selecting the ratio of the first type of memory blocks to hybrid memory blocks to include in the garbage collection process comprises determining whether a hybrid memory block included in the garbage collection process is replaceable by a second type of memory block of the plurality of the second type of memory blocks, the second type of memory block being allocated as a new hybrid memory block.

8. The method of claim 7, wherein the second type of memory block is selected to replace the hybrid memory block based, at least in part, on a number of program/erase (P/E) cycles associated with the second type of memory block.

9. A data storage device, comprising:
a processor; and
a storage balancing system associated with the processor and operable to:
  determine an amount of free space in a first partition of the data storage device and a second partition of the data storage device, the first partition comprising a plurality of a first type of memory blocks and the second partition comprising a plurality of a second type of memory blocks and a plurality of hybrid memory blocks;
  initiate a garbage collection process based, at least in part, on the amount of free space in the first partition and the second partition; and
  select a ratio of the first type of memory blocks to hybrid memory blocks to include in the garbage collection process based, at least in part, on the amount of free space in the first partition and the second partition and on a type of garbage collection process that is initiated.

10. The data storage device of claim 9, wherein the storage balancing system is further operable to determine whether a hybrid memory block that is included in the garbage collection process is replaceable by a second type of memory block of the plurality of the second type of memory blocks.

11. The data storage device of claim 10, wherein the second type of memory block of the plurality of the second type of memory blocks is selected based, at least in part, on a number of program/erase (P/E) cycles associated with the second type of memory block.

12. The data storage device of claim 9, wherein the type of garbage collection process includes one of a compaction process and a folding process.

13. The data storage device of claim 12, wherein selecting the ratio of the first type of memory blocks to the hybrid memory blocks to include in the garbage collection process is based, at least in part, on whether the garbage collection process includes the compaction process or the folding process.

14. The data storage device of claim 9, wherein the ratio is a first ratio when the amount of free space in the first partition and the second partition is below a first threshold and wherein the ratio is a second ratio when the amount of free space in the first partition and the second partition is below a second threshold that is less than the first threshold.

15. A data storage device, comprising:
means for determining an amount of free space in a first partition and a second partition of the data storage device, the first partition comprising a plurality of a first type of memory blocks and the second partition comprising a plurality of a second type of memory blocks and a plurality of hybrid memory blocks;
means for initiating a garbage collection process based, at least in part, on the amount of free space in the first partition and the second partition; and
means for selecting a ratio of the first type of memory blocks to hybrid memory blocks to include in the garbage collection process based, at least in part, on the amount of free space in the first partition and the second partition and on a type of garbage collection process that is initiated by the means for initiating the garbage collection process.

16. The data storage device of claim 15, further comprising means for determining whether a hybrid memory block that is included in the garbage collection process is replaceable by a second type of memory block of the plurality of the second type of memory blocks.

17. The data storage device of claim 16, wherein the second type of memory block of the plurality of the second type of memory blocks is selected based, at least in part, on a number of program/erase (P/E) cycles associated with the second type of memory block.

18. The data storage device of claim 15, wherein the first type of memory blocks are single-level cell (SLC) memory blocks and the second type of memory blocks are selected from a group of memory blocks comprising multi-level cell (MLC) memory blocks, triple-level (TLC) memory blocks, quad-level cell (QLC) memory blocks, and penta-level cell (PLC) memory blocks.

19. The data storage device of claim 15, wherein the type of garbage collection process initiated by the means for initiating the garbage collection process includes one of a compaction process and a folding process.

20. The data storage device of claim 15, wherein the means for selecting the ratio selects the ratio of the first type of memory blocks to the hybrid memory blocks to include in the garbage collection process based, at least in part, on whether the garbage collection process includes a compaction process or a folding process.

* * * * *